United States Patent
Rivlin

(10) Patent No.: US 9,683,899 B2
(45) Date of Patent: Jun. 20, 2017

(54) IMMERSIBLE FAST RESPONDING THERMOCOUPLE ASSEMBLY

(71) Applicant: Eitan Rivlin, Givat-Zeev (IL)

(72) Inventor: Eitan Rivlin, Givat-Zeev (IL)

(73) Assignee: Eitan Rivlin, Givat-Zeev (IL)

(*) Notice: Subject to any disclaimer, the term of this patent is extended or adjusted under 35 U.S.C. 154(b) by 372 days.

(21) Appl. No.: 14/365,631

(22) PCT Filed: Dec. 23, 2012

(86) PCT No.: PCT/IL2012/050546
§ 371 (c)(1),
(2) Date: Jun. 14, 2014

(87) PCT Pub. No.: WO2013/098816
PCT Pub. Date: Jul. 4, 2013

(65) Prior Publication Data
US 2014/0355652 A1    Dec. 4, 2014

(30) Foreign Application Priority Data
Dec. 28, 2011   (IL) .......................................... 217258

(51) Int. Cl.
*G01K 7/02*      (2006.01)
*G01K 7/04*      (2006.01)
(Continued)

(52) U.S. Cl.
CPC ................. *G01K 7/02* (2013.01); *G01K 1/14* (2013.01); *G01K 7/06* (2013.01); *G01K 13/02* (2013.01);
(Continued)

(58) Field of Classification Search
CPC .................................... G01K 7/02; G01K 7/06
(Continued)

(56) References Cited

U.S. PATENT DOCUMENTS 2,644,851 A    5/1950   Tapke
2,587,391 A *  2/1952   Seaver ..................... G01K 7/04
                                                    136/235

(Continued)

FOREIGN PATENT DOCUMENTS

WO    WO 2009/072049 A2    6/2009

OTHER PUBLICATIONS

International Search Report, Apr. 21, 2013, from International Phase of the instant application.

*Primary Examiner* — Gail Kaplan Verbitsky
(74) *Attorney, Agent, or Firm* — Steven C. Lessoff

(57) ABSTRACT

A sealed, immersible, fast responding, coaxial thermocouple assembly and mounting arrangement thereof, for fast temperature reading of high flow rate liquid streams in mixing valves comprising an insulated first-metal wire and a surrounding dissimilar second-metal tube, the second-metal tube is crimped at a first end over a stripped extremity of the insulated first-metal wire to form a large surface area, sealed thermocouple junction, shaped as a radial array of fins axially extending along a tip portion of the thermocouple assembly. A collar ring holder and elbow mounting arrangement is maintaining the thermocouple assembly longitudinal axis principally in the direction of the flow of the liquid stream axially flowing along the tip portion and at least an additional substantial portion of the thermocouple assembly length.

20 Claims, 5 Drawing Sheets

(51) Int. Cl.
*G01K 7/06* (2006.01)
*G01K 13/02* (2006.01)
*G05D 23/13* (2006.01)
*G01K 1/14* (2006.01)
*G05D 23/19* (2006.01)

(52) U.S. Cl.
CPC ......... *G05D 23/1393* (2013.01); *G05D 23/19* (2013.01); *G01K 2013/026* (2013.01)

(58) Field of Classification Search
USPC ......... 374/179, 141, 163; 136/200, 219, 228
See application file for complete search history.

(56) References Cited

U.S. PATENT DOCUMENTS

| | | | | |
|---|---|---|---|---|
| 2,978,527 A * | 4/1961 | Forde | ...................... | H01L 35/32 136/225 |
| 3,232,794 A * | 2/1966 | Korton | ...................... | G01K 7/04 136/233 |
| 3,333,838 A * | 8/1967 | Baatrup | .................. | F24C 3/128 136/200 |
| 3,942,242 A * | 3/1976 | Rizzolo | .................... | G01K 7/04 136/227 |
| 3,980,504 A * | 9/1976 | Wagner | .................. | H01L 35/32 136/217 |
| 4,224,461 A * | 9/1980 | Snyder, Jr. | ................ | G01K 7/04 136/230 |
| 4,337,221 A * | 6/1982 | Gray | ...................... | B28B 23/00 136/234 |
| 4,438,290 A * | 3/1984 | Wells, Jr. | .................. | G01K 7/04 136/201 |
| 4,618,091 A | 10/1986 | Buzzi | | |
| 4,749,415 A * | 6/1988 | Barton | ...................... | G01K 1/18 136/228 |
| 4,934,831 A * | 6/1990 | Volbrecht | ................ | G01K 1/08 29/612 |
| 5,121,994 A * | 6/1992 | Molitoris | ................ | G01K 1/10 136/232 |
| 6,190,038 B1 * | 2/2001 | Kita | ...................... | G01K 1/125 136/234 |
| 6,390,670 B1 | 5/2002 | Nimberger et al. | | |
| 6,740,806 B2 * | 5/2004 | Starer | ...................... | F23Q 9/00 136/203 |
| 7,004,626 B1 * | 2/2006 | Giberson | ................ | G01K 7/02 136/230 |
| 7,465,086 B1 * | 12/2008 | Foreman, Jr. | ............ | G01K 1/08 136/200 |
| 2006/0227849 A1 * | 10/2006 | Phillips | .................... | G01K 7/04 374/179 |
| 2009/0268779 A1 * | 10/2009 | Hotta | ...................... | G01K 1/10 374/179 |

* cited by examiner

IMMERSIBLE FAST RESPONDING THERMOCOUPLE ASSEMBLY

FIELD OF THE INVENTION

Priority is claimed on the national stage entry of PCT/IL2012012/050546 with the International Filing Date Dec. 23, 2012 that claims foreign priority to 217258, filed on Dec. 28, 2011.

The present invention relates to a sealed immersible fast responding thermocouple assembly and mounting arrangement thereof, more particularly to a thermocouple assembly for electric controlled thermostatic mixing valves.

BACKGROUND OF THE INVENTION

In electric controlled thermostatic mixing valves it is known to implement a thermistor type temperature sensing element as taught for instance in EP1229418 to Mountford at al or in WO2009072049 to the present applicant. Thermistors are actually variable resistors which change their resistance according to the surrounding temperature, they are easy to implement and stable on reading.

Thermistors may accept very small size but they are sensitive to the environment and must be electrically and mechanically isolated from the measured medium in particular when the medium is liquid. It is common practice to isolate such thermistors with direct glass or epoxy coating and encapsulate the fragile assembly in a brass or copper probe. The protective probe as well as the electric insulation, significantly extends the response time of the sensor. The response time is commonly expressed in terms of thermal time constant which is the time it takes for the sensor to reach 63.2% of the change in temperature. An example of such encapsulated thermistor commercial model is: FRP5 Fast-Response Thermistor Sensor made by ATC Semitec Ltd. In U.K. The time constant of such thermistor according to its data sheet is about 1 sec.

The sensor response time in an electrically operated mixing valves is of critical importance for stable temperature control especially during low flow rate conditions, hence the use of a thermistor may limit the overall performance of the control valve.

Thermocouple assemblies are in use since 1821, when T. J. Seebeck discovered the thermoelectric effect. According to the Seebeck effect, thermocouple circuit made of two wires of dissimilar metals connected at both ends (junctions), will generate a current and measurable, low voltage output that is approximately proportional to the temperature difference between the hot junction and the cold junction. Thermocouples are generally more rugged than thermistors of the same size but they require precise high gain electric amplification to yield a usable signal.

Three typical constructions of thermocouple assemblies are in common use, listed here by order of the response time; the ungrounded type where the sensing junction is enclosed in a sheath or probe and the junction is electrically isolated from the probe wall. The grounded type where the sensing junction, is wired directly to the probe wall, and the exposed type where the junction is outside the probe wall and is in direct contact with the target medium. The exposed type possesses the best heat transfer and quickest response time typically more than 50 times faster than an equivalent size sheathed thermistor probe. However the exposed thermocouple is also limited to non corrosive, typically dry surrounding medium.

In order to achieve fast response time close to that of an exposed junction while maintaining acceptable sealing and protection of the junction, it was suggested in U.S. Pat. No. 2,466,175 to Kretsch et al to use a coaxial thermocouple of which the first less corrosive metal is in the form of a tube which encircles the second more corrosive dissimilar metal accepting the form of a wire. The tube and the wire are spaced apart by an insulating media and welded together at one end to form a sealed junction.

A draw back of such construction lies in the fact that the outer metal tube has relatively large cross-section compared to the wire, allowing heat conduction to or from the region of the tube that is not immersed in the surrounding medium. This thermal wicking effect increases the thermal time constant of the thermocouple assembly. For instance, if a fast change of the medium temperature occurs such as happens in flows of hot and cold water in a mixing valve, response time will increase due to the fact that part of the heat energy is being dissipated along the thermocouple external metal tube to a portion that is far from the measuring junction.

Reducing the wall thickness of the metal tube or increasing the length of the immersed portion may improve performance, however such temperature sensors as indicated above for water mixing applications, typically protrude from the wall of the flow pattern towards the center of the flow and are subject to bending stresses formed by the impact of water which can gain speeds of up to 30 m/s. Certain minimal wall thickness and maximal exposure length must be maintained for reliable operation.

Another solution for fast response thermocouple is suggested in U.S. Pat. No. 7,004,626 to Giberson et al. Giberson describes a small mass hollow tip formed of a first-metal having a wire of the same metal welded internally to the shoulder of the tip and a second wire of a dissimilar metal extending into the hollow tip and through a small hole in the closed end of the tip. The second wire, protruding through the small hole, is welded at the outside of the tip. For mechanical strength, the hollow tip is held in an open ended sheath by a packing of thermal insulating material and RTV bond. This solution may serve its purpose but is expensive in production and may fail to properly seal the assembly against moister along an extended period of time.

Accordingly, there is a need for a fast responding, thin thermocouple assembly of the coaxial type, that is suitable for temperature measurement of fast flowing liquid streams. The ease of assembly and proper sealing of the junction and the external housing are of great importance.

SUMMARY OF THE INVENTION

It is therefore an object of the present invention to provide a sealed immersible fast responding thermocouple assembly for high flow rate liquid streams in mixing valves and a mounting arrangement thereof.

According to one aspect of the present invention, there is provided a sealed, immersible, coaxial thermocouple assembly for fast temperature reading of liquid stream in a mixing valve, comprising an insulated first-metal wire and a surrounding dissimilar second-metal tube, the second-metal tube is crimped at a first end over a stripped extremity of the insulated first-metal wire to form a large surface area, sealed thermocouple junction, shaped as a radial array of fins axially extending along a tip portion of the thermocouple assembly.

According to another aspect of the present invention, there is provided a mounting arrangement for the thermocouple assembly as described above in a valve housing, comprising; a discharge flow path made of a radial extension arching into an axial outlet forming together an elbow shape and an axial drill extending opposite the axial outlet. Wherein the elbow shape and drill enables insertion and mounting of the thermocouple assembly through the drill with its tip portion positioned approximately at the center of the axial outlet cross-section and the thermocouple assembly longitudinal axis laying principally in the direction of the flow of the liquid stream along the axial outlet. The liquid stream is axially flowing along the tip portion and at least additional substantial portion of the thermocouple assembly length.

According to yet another aspect of the present invention, the elbow shape described above may accept the form of an obtuse angle.

According to an additional aspect of the present invention, the drill mentioned above is ended in a tubular extension of the housing material protruding into the elbow arch in the direction of the axial outlet. The extension protects the thermocouple assembly against cross flow liquid stream entering the elbow arch.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE PREFERRED EMBODIMENTS

Figure 1:
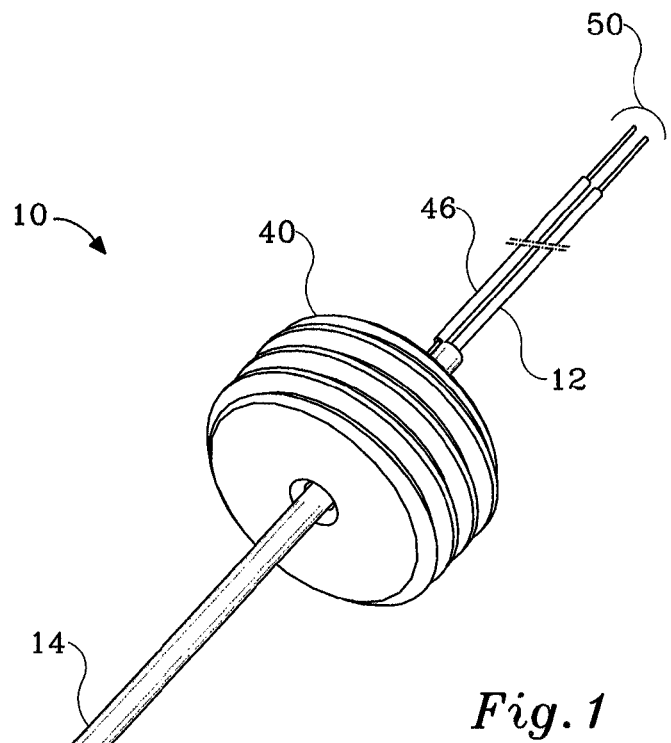
FIG. 1 is a perspective view showing the immersed side of a thermocouple assembly made in accordance with an embodiment of the present invention.
Figure 1A:
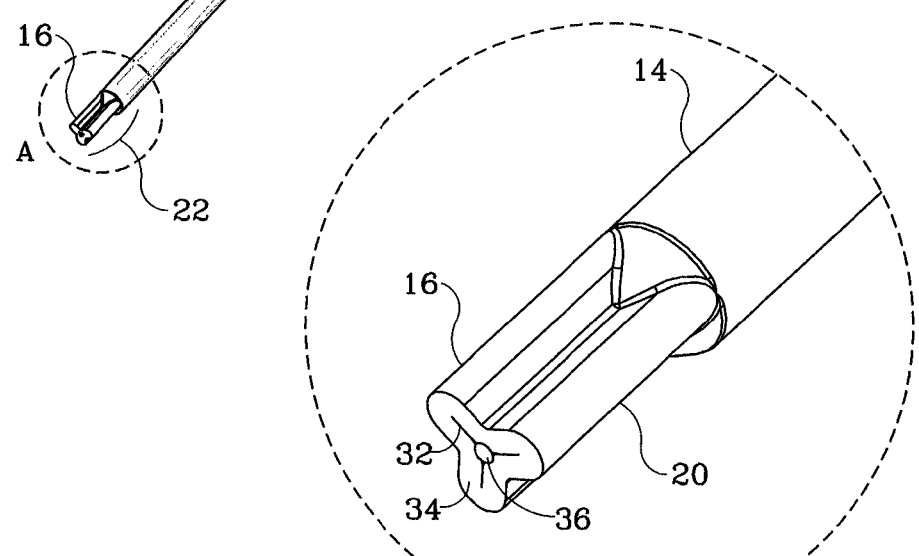
FIG. 1a is an enlarged view of the tip portion of the thermocouple assembly circled and marked A in FIG. 1.
Figures 2, 2A:
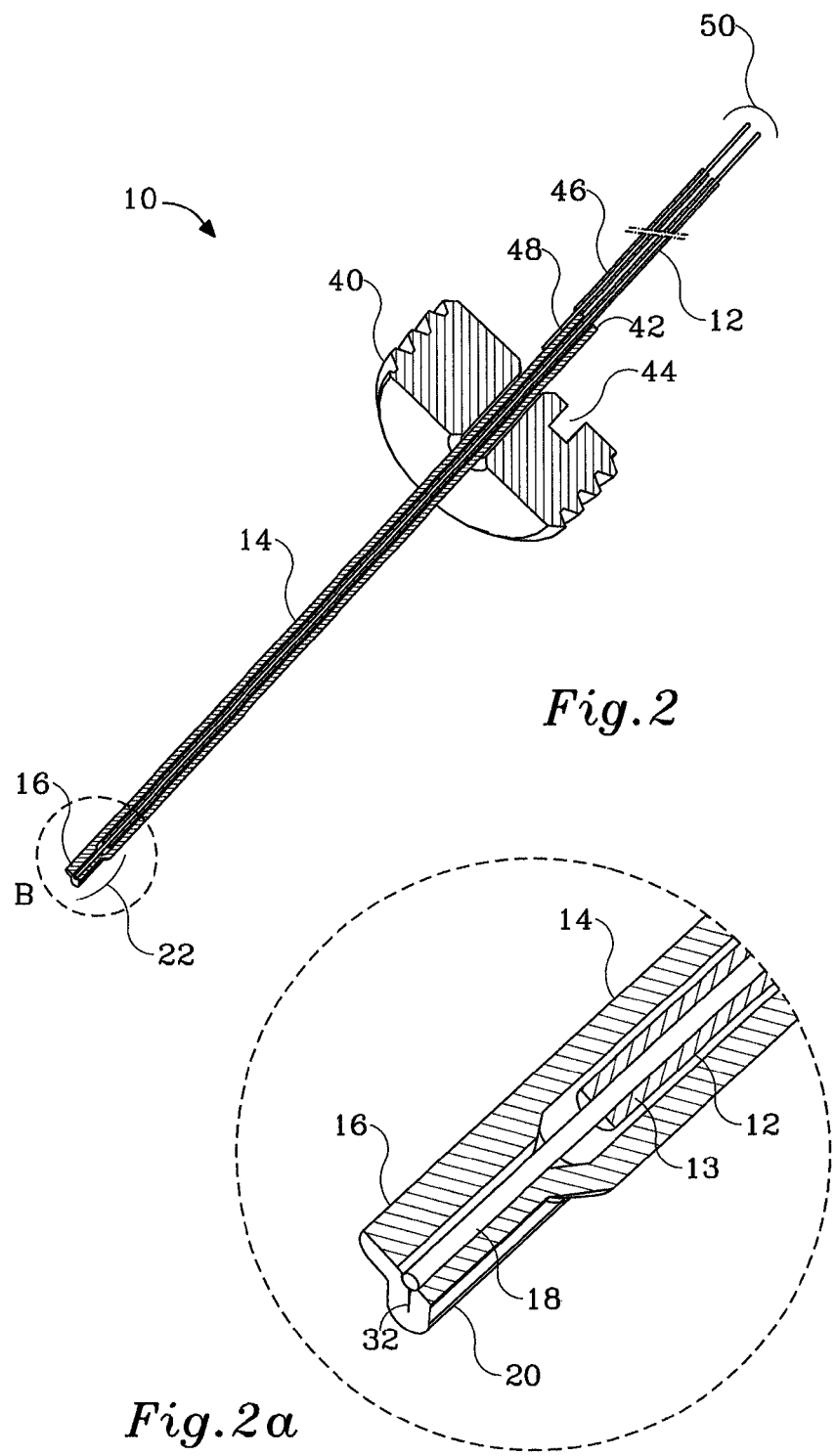
FIG. 2 is a sectional perspective view of the thermocouple assembly of FIG. 1.
FIG. 2a is an enlarged view of the tip portion of the thermocouple assembly circled and marked B in FIG. 2.

In the following description of some embodiments, identical components that appear in more than one figure or that share similar functionality will be referenced by identical reference symbols.

With reference to FIGS. 1, 1a, 2 and 2a, there is shown a sealed, immersible, coaxial thermocouple assembly generally referenced 10, for fast temperature reading of liquid stream in a mixing valve. The thermocouple assembly 10 comprising an insulated first-metal wire 12 and a surrounding dissimilar second-metal tube 14. The second-metal tube 14 is crimped at a first end 16 over a stripped extremity 18 (FIG. 2a) of the insulated first-metal wire 12 to form a large surface area, sealed thermocouple junction, shaped as a radial array of fins 20 axially extending along a tip portion 22 of the thermocouple assembly. The insulation layer 13 (FIG. 2a) may be any plastic material such as PVC or Teflon typically used in thermocouple applications.

Figure 4:
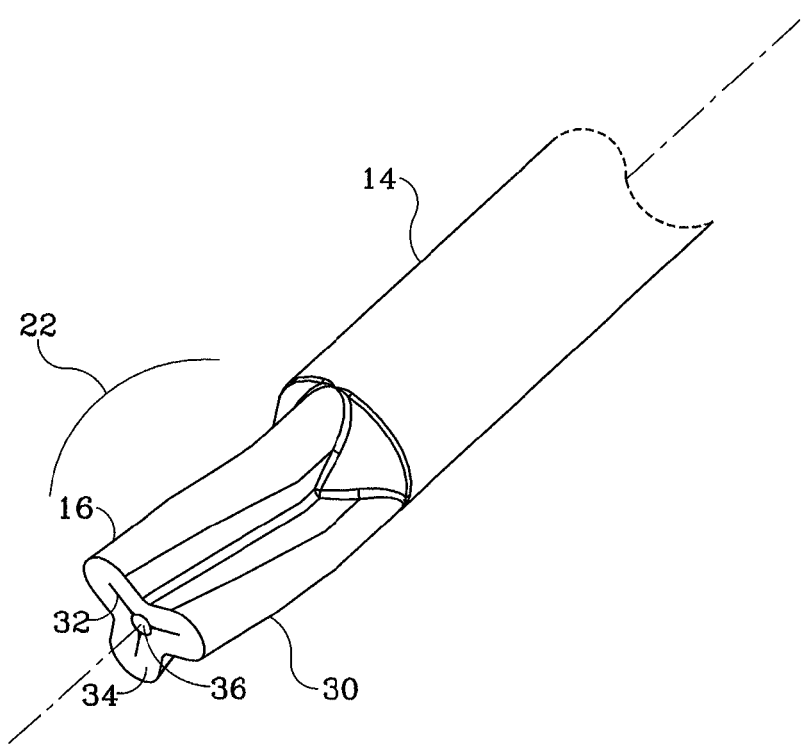
FIG. 4 is an enlarged perspective view of the tip portion of a thermocouple assembly made in accordance with another embodiment of the present invention.

For best performance, the radial array of fins 20 may comprise three fins (as shown in the figures), or four fins. Preferably but not necessarily the fins are equally spaced apart. It will be understood that any number and arrangement of fins is possible and falls under the scope of the present invention. The fins 20 are shown as flat fins however for faster response time, the fins 20 may accept a helical shape 30 (FIG. 4) curving around the thermocouple assembly axis. The curved fins 30 forces the water stream to stir, increasing the impact of the flow about the fins such that heat transfer between the liquid and the tip portion 22 is improved.

In order to achieve long term reliable sealing of the thermocouple assembly 10 against moister intrusion, the crimp folding lines 32 on the end face 34 of the tip portion 22, and the perimeter of the first-metal wire 12 extremity 18 end face 36 are soldered or welded together. Other techniques for sealing may include brazing, bonding or pressure diffusion. If the welding process is chosen, laser welding is preferred. Soldering may be performed by the known wave solder technique or by simple dipping in hot tin bath. Bonding is preferably made with an electric conductive bond.

Figure 3:
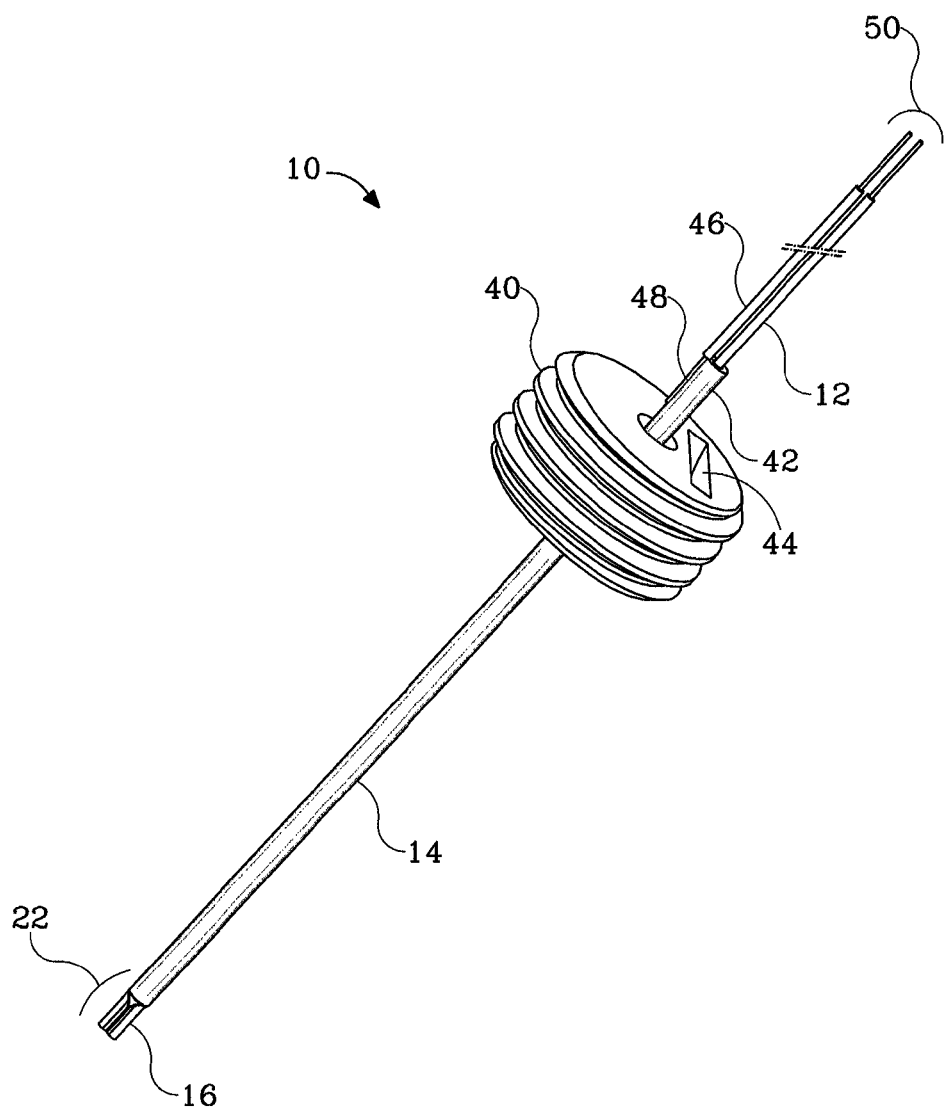
FIG. 3 is a perspective view of a thermocouple assembly of FIG. 1, showing the dry side.

With reference now to FIG. 3, which is shown from the perspective of the dry side which is not immersed in the liquid stream. For fastening of the thermocouple assembly 10 in position in a mixing valve, the second-metal tube 14 is provided with a collar ring 40 next to its second end 42. Typically, the collar ring 40 is made of metal and can be soldered, welded, brazed, press fitted or bonded to the second-metal tube 14. The location of the collar ring 40 along the second-metal tube 14, defines the length of the immersed portion of the thermocouple assembly 10, as will be hereinafter described with reference to FIG. 5. As shown in the figures, the collar ring 40 may be externally threaded to provide easy assembly and replacement means into the mixing valve hosing. The collar ring 40 is slotted 44 on the dry side face for assembly by means of a screwdriver. The collar ring 40 can also be made of plastic material by direct injection molding of the collar ring 40 on the second-metal tube 14.

An insulated second-metal extension wire 46, is stripped at one end 48 and soldered or welded externally to the second end 42 of the second-metal tube 14 right after the collar ring 40. The first-metal wire 12 and the second-metal extension wire 46 may extend to any length at their distal striped end 50, as required to reach a separate electronic amplifier (not shown).

Accordingly if a fast responding T type thermocouple is required for example, the first-metal wire 12 is made of Constantan, while the second-metal tube 14 and the second-metal extension wire 46 are made of Copper. If the application requires more corrosion resistance and response time is not critical, the T type thermocouple can be used with said second-metal tube 14 and the second-metal extension wire 46 being made of Constantan while the first-metal wire 12 made of Copper. It will be understood that any pair of dissimilar metals selected from the known types including: Iron-Constantan (Symbol J), Copper-Constantan (Symbol T), Chromel-Alumel (Symbol K), Chromel-Constantan (Symbol E) or any other pair of dissimilar metals, will all serve to the same extent and fall under the scope of the present invention.

As indicated in the background, the present invention also seeks to provide a mounting arrangement that permit usage of the thermocouple assembly 10 of a very thin cross-section, as described above, even in extreme liquid stream flow speeds. Accordingly, with reference to FIG. 5, there is shown a longitudinal cross-section through a thermostatic proportioning valve unit generally referenced 60, making use of a thermocouple assembly 10 made in accordance with an embodiment of the present invention. It will be understood by the person skilled in the art that same implementation can be carried out in other mixing valves and is not limited to the valve 60 described here by a way of example only. The operation of the valve itself is described in WO2009072049 and will be explained here briefly. However the positioning and use of the thermocouple assembly is different than described in WO2009072049.

Figure 5:
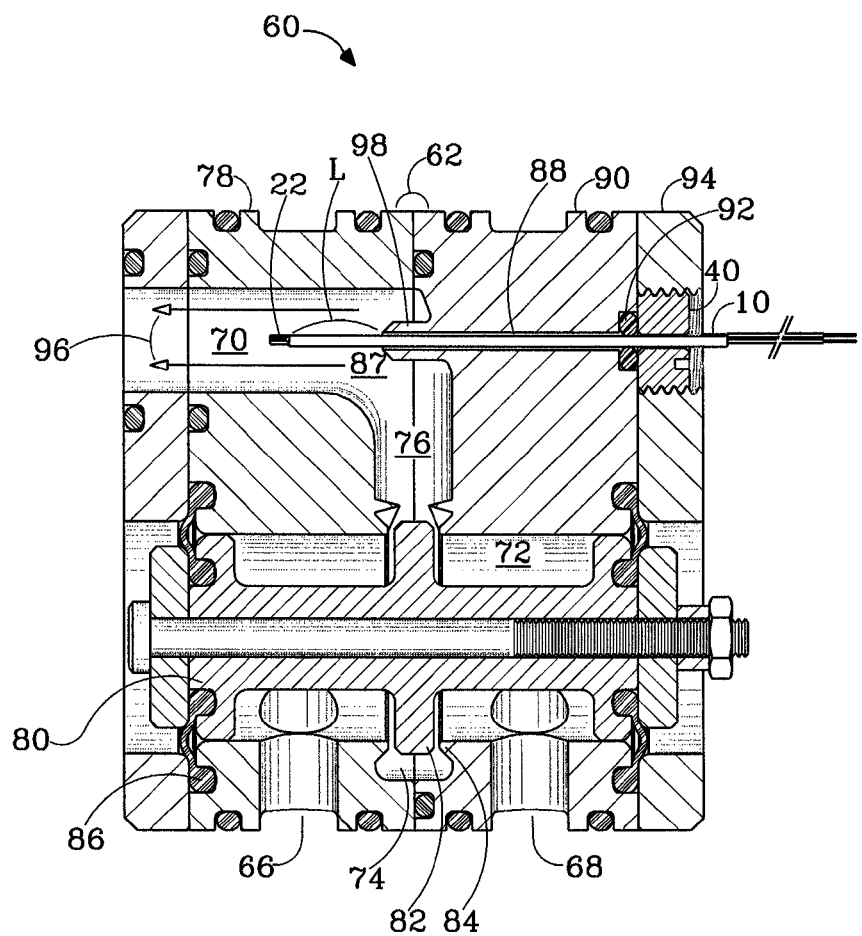
FIG. 5 is a sectional view taken along a mixing valve unit making use of a thermocouple assembly made in accordance with an embodiment of the present invention.

As shown in FIG. 5, the thermostatic proportioning valve 60 is composed of a two halves cylindrical housing 62, having a cold water inlet 66, a hot water inlet 68 and axial mixed water outlet 70. A longitudinal through passing spool bore 72 is formed in the housing 62, being in flow communication with the cold and hot water inlets 66, 68 respectively. The spool bore 72 includes a generally central widened portion serving as a mixing chamber 74. The mixing chamber 74 being discharged through a radial extension 76, arching into the axially oriented outlet 70 formed in the left half 78 of housing 62.

A spool 80, with a central widened disk portion 82, is loosely axially movable within the spool bore 72 with the disk portion 82 traveling in the spool bore widened portion between two opposing seats 84. Two diaphragm seals 86 disposed at both ends of the spool 80 and housing 62, elastically seals the open ends of spool bore 72.

Axial displacement of the spool 80, by means of a drive unit (not shown) proportions the flows of hot and cold water to adjust the outlet water temperature which is measured by the thermocouple assembly 10.

Now taking a closer look at the discharge flow path made of the radial extension 76 arching into the axial outlet 70 forming together with arch 87 an elbow shape and an associated axial drill 88 extending opposite the axial outlet 70. The elbow shape and drill 88 enables insertion and mounting of the thermocouple assembly 10 through the drill 88, formed in the right half 90 of housing 62, having the same axial attitude as the axial outlet 70. A rubber seal 92 sealing against the collar ring 40 is seated in a recess in the right half 90 of housing 62 prior to fixation of the thermocouple assembly by means of the collar ring 40 being threaded into a threaded bore in back plate 94. Upon fixation of the thermocouple assembly 10, the tip portion 22 is positioned approximately at the center of the axial outlet 70 cross-section, with the thermocouple assembly 10 longitudinal axis laying principally in the direction of the axial outlet 70 liquid stream indicated by arrows 96. Accordingly, the liquid stream enclosed in outlet 70 is axially flowing along the tip portion 22 and at least a substantial portion marked L of the thermocouple assembly length which is protruding from the right half 90 of the housing into the outlet 70 liquid stream flow path.

Optionally, the drill 88 is ended in a tubular extension 98 made of the right half 90 housing material, protruding into the elbow arch 87 in the direction of the axial outlet 70. The extension 98 protects the thermocouple assembly against cross flow liquid stream entering the elbow arch 87 through radial extension 76.

It will be understood that the elbow shape formed by the radial extension 76 and downstream outlet 70 may not necessarily form a right angle but any obtuse angle is permitted or even desired as long as the thermocouple assembly 10, longitudinal axis is laying principally in the direction of the outlet 70.

In such a manner, as indicated above, the water flow does not apply any shear or bending stresses on the thermocouple assembly and a second-metal tube 14 of very thin cross-section can be used. Typical diameter of such second-metal tube 14 is in the range of 0.5 mm to 1 mm and its wall thickness is in the range of 0.2 mm to 0.4 mm. Typical first-metal insulated wire 12 diameter is in the range of 0.2 mm to 0.4 mm including the insulation layer.

Additionally the length of the portion L which is in direct contact with the stream flow is typically in the range of 5 mm to 12 mm, long enough to substantially eliminate the above mentioned thermal wick effect.

It will be understood that such small diameter of a thermocouple assembly preferably making use of a copper tube will have a very fast response time typically in the range of 5 to 20 milliseconds.

It will be evident to those skilled in the art that the invention is not limited to the details of the foregoing illustrated embodiments and that the present invention may be embodied in other specific forms without departing from the scope of the appended claims.

The invention claimed is:

1. A sealed, immersible, coaxial thermocouple assembly for fast temperature reading of a liquid stream in a mixing valve, comprising a wire comprising a first-metal and a surrounding tube comprising a second-metal; a tip portion of said tube is crimped at a first end of said tube over an extremity of said wire to press said tip portion of said tube against said extremity of said wire to form a thermocouple junction including electric contact between the wire and the tube; said tip portion is shaped by said crimping as a radial array of axially extending fins said thermocouple assembly further comprising a fastener fixing said tube into a mixing valve, such that the liquid stream flows from the mixing valve through an outlet of the valve axially along said tip portion and at least a substantial portion of said tube length.

2. A thermocouple assembly as claimed in claim 1, wherein said radial array of fins comprises a number of fins selected between three fins and four fins, equally spaced apart.

3. A thermocouple assembly as claimed in claim 1, wherein the fins of said radial array of fins are curved in a helix shape around said thermocouple assembly axis.

4. A thermocouple assembly as claimed in claim 1, wherein crimp folding lines formed on an end face of said tip portion and the perimeter of an end face of said wire extremity, are sealed using a technique chosen from the list of; welding, laser welding, diffusing, soldering, brazing, and bonding.

5. A thermocouple assembly as claimed in claim 1, wherein said fastener includes a collar ring fixed to said tube next to a second end of said tube.

6. A thermocouple assembly as claimed in claim 5, wherein said collar ring is made of metal and is fixed to said tube by a technique selected from the list of; soldering, welding, brazing bonding and press fitting.

7. A thermocouple assembly as claimed in claim 5, wherein said collar ring is made of plastic material directly injected over said second-metal tube.

8. A thermocouple assembly as claimed in claim 5, wherein said collar ring is externally threaded and includes a dry side face opposite said thermocouple junction and wherein said dry side face is slotted.

9. A thermocouple assembly as claimed in claim 1, wherein an extension wire comprising said second metal is externally soldered to a second end of said tube.

10. A thermocouple assembly as claimed in claim 1, wherein one of said first-metal and said second metal is Copper and another of said first metal and said second-metal is Constantan.

11. A thermocouple assembly as claimed in claim 1, wherein said tube diameter is selected in the range of between 0.5 mm and 1 mm.

12. A thermocouple assembly as claimed in claim 1, wherein a wall thickness of said tube is selected in the range of 0.2 mm to 0.4 mm.

13. A thermostatic mixing valve comprising: a thermocouple assembly as claimed in claim 1 and a discharge flow path made of a radial extension arching from said mixing valve into said outlet forming together an elbow shape, and an axial drill extending opposite said outlet; wherein said elbow shape and said drill enable insertion and mounting of said thermocouple assembly through said axial drill with said tip portion positioned approximately at the center of a cross-section of said outlet and with a longitudinal axis of said tip portion and said substantial portion of said tube lying principally in the direction of the flow of a liquid stream along said outlet, such that said liquid stream flows axially along said tip portion and said at least a substantial portion of said tube.

14. A thermostatic mixing valve as claimed in claim 13, wherein said elbow shape is in the form of an obtuse angle.

15. A thermostatic mixing valve as claimed in claim 13, wherein said drill ends in a tubular extension, said tubular extension protruding into said elbow arch in the direction of said outlet, said tubular extension protecting said tube from cross flow in the liquid stream entering said elbow arch.

16. A thermostatic mixing valve as claimed in claim 13, wherein a total length of said tip portion and said substantial portion of said tube is selected in the range of 5 mm to 12 mm.

17. A thermostatic mixing valve as claimed in claim 13, wherein said fastener includes an externally threaded collar ring fixed to said tube and a rubber seal seated in a recess in said outlet; said rubber seal sealing against said collar ring.

18. A thermocouple assembly as claimed in claim 1, wherein said wire includes an insulated portion and a non-insulated portion, said non-insulating portion including said extremity.

19. A thermocouple assembly as claimed in claim 1, wherein said fins are configured to increase a heat transfer between a liquid passing along said tip portion and said thermocouple junction.

20. The thermocouple assembly of claim 1 wherein said fastener fastens said thermocouple assembly to said outlet with said tip portion and at least a substantial portion of said tube in said outlet and with a longitudinal axis of said tip portion and at least a substantial portion of said tube lying principally in the direction of a central axis of the outlet.

* * * * *